United States Patent [19]

Erhan et al.

[11] Patent Number: 5,713,990
[45] Date of Patent: Feb. 3, 1998

[54] VEGETABLE OIL-BASED OFFSET PRINTING INKS

[75] Inventors: Sevim Z. Erhan, Peoria; Marvin O. Bagby, Morton, both of Ill.

[73] Assignee: The United States of America as represented by the Secretary of Agriculture, Washington, D.C.

[21] Appl. No.: 624,870

[22] Filed: Mar. 27, 1996

[51] Int. Cl.⁶ ........................................ C09D 11/06
[52] U.S. Cl. ...................... 106/31.35; 106/31.67; 106/248
[58] Field of Search ................ 106/27 R, 28 R, 106/29 A, 243, 244, 246, 248, 31.35, 31.67

[56] References Cited

U.S. PATENT DOCUMENTS

| | | | |
|---|---|---|---|
| 2,762,712 | 9/1956 | Bloch et al. | 106/28 |
| 3,804,640 | 4/1974 | Buckwalter | 106/27 |
| 4,045,232 | 8/1977 | Parkinson | 106/28 |
| 4,419,132 | 12/1983 | Moynihan | 106/27 |
| 5,122,188 | 6/1992 | Erhan et al. | 106/28 |

OTHER PUBLICATIONS

Hartsuch, Paul J., *Chemistry for the Graphic Arts*, Graphic Arts Technical Foundation, copyright 1979, pp.220 (no month).

Richlin, Milton (sonsultant) and Filipe Martin Degen Co., "Vehicles for Printer Ribbon Inks", *American Ink Marker*, May 1987, pp. 14, 16, 18, & 48.

*Industrial Bioprocessing*, "IB Market Forecast Soy-Based Inks: US and Western European Consumption Will Double by 1995; Market Could Approach $800 Million", Copyright Nov. 1991, vol. 13(11).

Kobayashi, Seitaro, "Discharge Printing by Offset Printing", Abstract 112189n, Japan 78 17,716, *39–Textiles*, vol. 89, 1978, Jun.

*Primary Examiner*—Deborah Jones
*Attorney, Agent, or Firm*—M. Howard Silverstein; Curtis P. Ribando; John D. Fado

[57] ABSTRACT

Sheet-fed and heat-set web offset ink vehicles, which do not require any volatile organic compounds, are prepared by blending: (I) as the major component, a petroleum resin, an alkyd resin or a heat bodied oil; (II) a non-bodied vegetable oil; and (III) one or more fatty acid esters. Inks prepared from these vehicles are quick drying and meet or exceed industry standards in regard to ruboff resistance, viscosity, and tackiness.

16 Claims, No Drawings

VEGETABLE OIL-BASED OFFSET PRINTING INKS

BACKGROUND OF THE INVENTION

1. Field of the Invention

In the printing industry, the processes in current use include lithography (47% share of the industry), gravure (18%), flexography (18%), letterpress (8%), electronic (3%) and screen printing and other miscellaneous processes (6%).

Printing inks that are conventionally used in these applications are multicomponent systems comprising: (1) the pigment; (2) a hydrocarbon and/or alkyd resin; (3) a hydrocarbon solvent; and (4) optional additives. For example, a typical petroleum-based, black, litho-news ink would be comprised of 15–20% carbon black as the pigment, 15–25% hydrocarbon or alkyd resin, and 50–70% mineral oil solvent. Nearly 500 million kilograms of inks for these applications are produced domestically each year. This volume of production represents a substantial consumption of a petroleum-based fraction. The petroleum oil shortage in the mid 1970's stimulated research to find alternatives to mineral oil and other petroleum products in ink formulations.

This invention relates to vehicles for use in production of vegetable oil-based, sheet-fed and heat-set web offset inks which do not require petroleum products and which possess the desirable properties for most printing ink applications. Desired wet ink properties include shelf stability, printability, rapid drying viscosity and tack.

2. Description of the Prior Art

Inks containing vegetable oils have been formulated for various specialized applications. For example, Ono et al. [Japanese Kokai Tokyo Koho JP 61/123,681] show hot-melt copying inks comprising a pigment in a nondrying vegetable oil and vegetable wax base. Kuzuwata [Japanese Kokai Tokyo Koho JP 63/277,287] teach stencil printing inks comprising a minor proportion of vegetable oil in a predominantly water-based formulation. Gupta et al. [Indian Patent IN 154,760] report an ink for stamp cancellation containing inedible vegetable oils, dispersing agents, and pigments.

Vegetable oils polymerized by oxygenation were evaluated for use as vehicles for typewriter and printer ribbon inks by Richlin et al. [Amer. Ink Maker 65(5): 14–18, 48 (May 1987]. Also, a vehicle comprising a blend of ester gum, alkyd, cetanol, and vegetable oil for use in discharge printing of fabrics has been taught by Kobayashi [Japanese Patent 78/17,716].

In the early 1980's, the American Newspaper Publishers Association (ANPA, now Newspaper Association of America) directed a research effort on developing a nonpetroleum-based vehicle for news inks. A series of ink formulations were patented by Moynihan comprising a blend of Gilsonite® (uintaite) and tall oil fatty acids together with carbon black pigment. U.S. Pat. No. 4,419,132 relates to a printing ink comprising 16.5–21.5% carbon black, 16.4–25.1% Gilsonite®, and 54.9–64.4% tall oil fatty acid. U.S. Pat. No. 4,554,019 is drawn to a letterpress ink having 6.0–19.8% carbon black, 16.4–26.3%, and 52.7–70.5% tall oil fatty acid. The offset printing ink of U.S. Pat. No. 4,519,841 comprises 10–27.8% carbon black, 17.6–23.5% Gilsonite®, and 50.1–54.9% tall oil fatty acid. Acceptance of these inks by the industry has been limited by the cost and availability of tall oil and the difficulty of equipment cleanup caused by the Gilsonite®. A later approach by ANPA to produce a vegetable oil-based ink vehicle resulted in a lithographic news ink comprising 50–60% alkali-refined soybean oil, 20–25% of a hydrocarbon resin ("Picco 5140"), and about 20% carbon black pigment. Widespread commercial acceptance of this ink has been inhibited by the cost, which is 50–70% more than traditional petroleum-based black inks.

Erhan et al. (U.S. Pat. No. 5,122,188, herein incorporated by reference), teach a completely nonpetroleum-based newspaper printing ink vehicle produced by a heat bodying process. This vehicle is: (1) cost competitive with petroleum-based ink vehicles; (2) does not require any petroleum-derived component; (3) resists ruboff on hands and clothing; and (4) enables formulation over a wide range of viscosities required by various printing applications. These inks are also environmentally "friendly" because they are formulated without volatile organic compounds (VOC), and the vehicle portion of the ink is readily biodegradable.

The potential advantages of other types of inks being similarly produced from completely nonpetroleum-based vehicles are readily apparent. The current United States market for sheet-fed inks is greater than 100 million pounds and for heat-set inks greater than 400 million pounds. This compares to approximately 500 million pounds for offset news inks. The world-wide market for these inks is estimated to be at least twice that of the domestic market. Sheet-fed printing is used for books, newspaper advertisement inserts, and other material requiring bond or coated paper. Sheet-fed inks dry by a combination of oxidation, absorption into the paper, and evaporation. Heat-set inks are typically used for non-porous substrates, such as glossy paper applications (e.g. magazine covers). These inks dry by both evaporation of VOC and catalyzed polymerization. The VOC level in sheet-fed formulations is typically in the range of about 10–20% and for heat-set formulations the VOC level is typically about 35–45%.

SUMMARY OF THE INVENTION

We have now succeeded in making vegetable oil-containing printing ink vehicles for use in formulating sheet-fed and heat-set web offset inks having all of the aforementioned characteristics. These vehicles are prepared by blending: (I) as the major component, a heat bodied oil as described in Erhan et al., supra, a petroleum resin, or an alkyd resin; (II) a non-bodied vegetable oil; and (III) one or more fatty acid esters. The blends can be easily tailored to give products having a range of properties (e.g., viscosity, tackiness, etc.) enabling use for formulating inks having a variety of end use applications.

In accordance with this discovery, it is an object of the invention to produce sheet-fed and heat-set web offset vegetable oil-based printing ink vehicles which do not require any volatile organic compound.

It is also an object of this invention to provide printing ink vehicles derived from a renewable resource, and particularly from an agricultural product.

Another object of the invention is to provide vegetable-based printing inks which meet or exceed industry standards in regard to ruboff resistance, viscosity, and tackiness for a variety of printing applications.

A further object of the invention is to provide a competitively priced alternative to petroleum-based inks.

Other objects and advantages of the invention will become readily apparent from the ensuing description.

DETAILED DESCRIPTION OF THE INVENTION

In the most preferred embodiment of the invention, all three essential components of the subject vehicles are derived from vegetable oils. These oils are the commonly available vegetable triglycerides in which the preponderance of the fatty acid ester moieties have a chain length of 16 or more carbon atoms. Of particular interest are drying and semi-drying oils having a substantial proportion of the diunsaturated linoleic fatty acid and triunsaturated linolenic fatty acid moieties. Exemplary vegetable oils contemplated herein are soybean, cottonseed, linseed, safflower, sunflower, corn, sesame, tung, canola (rapeseed) and peanut.

Though the aforementioned oils may be employed in the crude state as originally expressed from the seed material, there are advantages to subjecting them to certain preliminary processing steps. For example, alkali refining removes the gums and phospholipids which may interfere with the properties of the vehicles and the ultimate ink formulations. Alkali refining also removes free fatty acids, which tend to reduce hydrophobicity properties desired in certain ink formulations.

Component I. As previously stated, the principal component (about 75–90%) of the subject vehicles is preferably prepared by thermal transformation of the vegetable oil starting material by a process known as "heat bodying". In general, the oil is heated with mixing to a suitable temperature to promote an increase in the viscosity of the oil. It is generally accepted that the process of heat bodying promotes polymerization of the vegetable oils. Without desiring to be bound to any particular theory of operation, it is our belief that the heat treatment causes conjugation of conjugatable double bonds, and that inter- and intrapolymers are formed by virtue of cyclization involving conjugated double bonds of one fatty acid ester moiety and a point of unsaturation on another moiety.

The temperature of heating is preferably selected to minimize the length of time required to achieve the desired reaction without causing substantial degradation of the oil or its reaction products. A temperature range of about 275°–340° C. is suitable for most oils, with a range of about 325°–335° C. being preferred. By conducting the heat bodying reaction in nitrogen or other suitable inert atmosphere, oxidation and its consequent darkening effect on the oil are minimized. It is contemplated that catalysts, such as anthroquinone, or elevated pressures can be used to accelerate the rate of conjugation and thereby reduce the time period for heat-bodying. The catalyst can then be recovered and subsequently reused.

For most applications, it is desired that Component I have a viscosity on the Gardner-Holdt Viscometer Scale in the range of $Z-Z_5$ (about 23–99 poises) and preferably in the range of $Z_2-Z_3$ (about 36–46 poises). The correlation between Gardner-Holdt viscosities and poises is given in Table 12.4 of Bailey's Industrial Oil and Fat Products, 3rd Edition, page 513, herein incorporated by reference. One approach to obtaining a heat-bodied oil having appropriate viscosity is simply to continue the heat-bodying reaction until the oil thickens to that viscosity. However, we have unexpectedly discovered that a vehicle having better drying properties is obtained if a major amount of a heat-bodied oil more viscous than $Z_2-Z_3$ is blended with a minor amount of a heat-bodied oil that is less viscous. For example, in a preferred embodiment of the invention, a blend of $Z_3-Z_4$ and $Z_1-Z_2$ in a ratio of about 9:1 yields the desired combination of tack and drying properties. Manipulation of the heat-bodied oils to be blended and the proportions thereof to yield a vehicle having the ideal properties for a given application would be well within the skill of person in the art.

Alternatively, Component I of the vehicles of this invention can be prepared by the same method as described for the "Type II" vehicle in Erhan et al., supra. In the Type II method, the vegetable oil is heat-bodied until the oil gels. The distinction between the thickened polymerized oil and the gel is visually apparent, and is manifest by "clumps" of the vehicle riding up on the stirring apparatus. It is preferred to terminate the reaction at the point of gel transition. Molecular weights of these gels range from about 15,000 for those derived from sunflower seed oil to about 60,000 for those from soybean oil. The gel is then blended with unmodified vegetable oil in suitable proportions to yield a vehicle of the desired viscosity. Heating the mixture in an inert atmosphere up to about 340° C. for a short time softens the gel and facilitates blending. Dissolution of the gel component in the oil under these conditions tends to be complete, obviating the need for filtration. The principal advantage of the Type II vehicle is that the gel can be prepared and stored as a stock material for subsequent custom blending of vehicles over a broad viscosity range.

In yet another embodiment of the invention, a petroleum or alkyd resin can be used for Component I, with the understanding that inks formulated from such vehicles would not be characterized by the same level of biodegradability as those formulated from the previously-described vehicles prepared from heat-bodied oils.

Component II. The second component of the vehicles of this invention is a nonheat-bodied vegetable oil, preferably one of the aforementioned oils which has been alkali refined and a major proportion (at least about 50%) of which comprises unsaturated fatty acid moieties to include monoenes, conjugated dienes, methylene-interrupted dienes, or polyenes having at least one pair of conjugated or methylene-interrupted double bonds. The primary function of this component is to impart to the vehicle the desired rheological properties as further described below. The nonheat-bodied oil will have the effect of reducing the viscosity imparted by Component I to a predetermined value appropriate for the desired end use. Component II will typically comprise about 5–25% of the vehicle, and preferably about 10–15% of the vehicle.

Component III. The third critical component of the subject vehicles is a monoester of an unsaturated fatty acid or a blend of unsaturated fatty acid monoesters. Preferably, the fatty acid is a polyunsaturated acid, most notably linoleic or linolenic acid. From an economical standpoint, it is preferred that the ester is a methyl ester, though it is envisioned that other lower alkyl or vinyl esters (C1–C5) would also be functional in imparting the requisite drying properties to the vehicles. Exemplary esters, without limitation thereto, include methyl linoleate, methyl linolenate and monoesters of any of the aforementioned vegetable oils, such as linseed oil methyl ester, safflower oil methyl ester, and tung oil methyl ester. The amount of ester should be such that the unsaturated moiety does not exceed a stoichiometric amount of unsaturated moiety in Component II. Usually, Component III will be incorporated at a relatively low level, that is, on the order of about 0.5–3% by weight of the vehicle, with the preferred amount being 0.6–1%.

Together, Components I and II constitute the major fraction of the solvent system of the vehicle, and are thereby primarily responsible for the rheological properties of the formulated ink. While not desiring to be bound to any particular mechanism of operation, it is believed that Components II and III undergo some degree of polymerization, such as a Diels-Alder reaction, when exposed to atmospheric oxygen and/or heat at the time of printing. To promote such a reaction, it is therefore important that: (1) at least about 50% of one or both of Component II and Component III be polyunsaturated, that is, be comprised of conjugated dienes, methylene-interrupted dienes, or polyenes having at least one pair of conjugated or methylene-interrupted double bonds; and (2) a major proportion (at least about 50%) of the other component comprise some level of unsaturation.

In the preferred embodiment of the invention wherein a heat-bodied oil is used as Component I, the resultant vehicles are characterized by an exceedingly light coloration. They have a value on the Gardner Color Scale of about 6 or less, and typically in the range of about Inks are prepared from the aforementioned vehicles by formulation with pigment and miscellaneous additives as required for the prospective application. The vegetable oil vehicles of the invention are compatible with the pigments commonly used in the sheet-fed and heat-set printing industries. The amount of pigment in the formulation will typically be in the range of about 10–25% (w/w). Currently in the ink industry, pigments are sold in powdered form or as soybean oil- or mineral oil-based premixes. The pigment or pigment premix is blended into the vehicle by means of any conventional mixing apparatus until a uniform dispersion is obtained. The thickening effect of the pigment on the base vehicle is considered in preselecting a vehicle viscosity. Additives which may be formulated into the inks include toners, driers, thickeners, gellants, waxes, antioxidants, and the like. Determination of the amounts of these additives would be within the skill of a person in the art.

Inks prepared in accordance with the invention are characterized by viscosities in the range of about 80–150 poises and tacks in the range of about 8–30 g-m. The typical viscosity for a sheet-fed ink is in the range of about 80–140 poises, and about 100–150 poises for a heat-set web offset ink. Tack values for the sheet-fed inks are about 8–17 g-m, and about 8–30 g-m for the heat-set inks. Inks of the invention having these properties are also characterized by rapid drying, acceptable or superior ruboff values and easy cleanup from printing equipment.

An alternative application for the ink vehicles of the invention is for waterless printing technology. It is also envisioned that Components II and III can be combined as reactive nonvolatile diluents in paints and coatings.

It is understood that the foregoing detailed description is given merely by way of illustration and that modification and variations may be made therein without departing from the spirit and scope of the invention.

In the following examples, the viscosity of each vehicle and/or ink sample was obtained at a reference temperature of 25° C. with a Laray Falling-rod Viscometer using ASTM D.4040. Apparent tack of each vehicle and/or ink sample was measured using the procedure outlined in ASTM D-4361 for the Electonic Inkometer.

Drying tests of both vehicles and formulated inks were conducted on the Prüfbau Printability Tester®. A 1μfilm of the vehicle or ink was printed on coated heat-set paper at 600N pressure, 1.0 m/s, distributing ink on a rubber covered cyclinder. The print was dried on the Sinvatrol® Laboratory Heat-set Dryer set at 350° F. (177° C.) and 0.3 m/min, the print was given 1 pass, 5 passes, or 10 passes.

The point at which the print was dry was determined by placing a strip of newspaper on top of the print and passing the printed paper and newspaper together through the Prüfbau in contact with a metal cylinder at 800N and 1.0 m/s, and then examining the point for any signs of ink setoff from the newspaper. This test was conducted on the print before and after 1, 5, or 10 passes on the Sinvatrol®.

To test for VOC, EPA Method 24 was used. This method specifies heating the sample at 110° C. for 1 h in a forced air oven. The amount of weight loss was measured by the difference of weight before and after heating.

EXAMPLE 1

Alkali-refined soybean oil (300–1600 ml) was placed in a 0.5–2 L four-necked reaction flask equipped with a "jiffy Mixer" stirrer. The oil was heated at 330°±3° C. in a nitrogen atmosphere from 1–3 hrs until the desired viscosity in the range of A (0.50 P) to $Z_4$ (63.4 P) on the Gardner-Holdt Viscosity Scale was reached. The soybean oil-based vehicles prepared by this procedure are hereafter referred to as "heat-bodied oils", and are differentiated from one another by their respective viscosity scale designations.

EXAMPLES 2–10

Ink vehicles reported in Table I, below, were formulated to comprise:
77.05% $Z_3$–$Z_4$ heat bodied soybean oil
8.56% $Z_1$–$Z_2$ heat bodied soybean oil
13.67% alkali refined soybean oil
0.72% monoester
0–2% cobalt drier
The blended heat bodied oils were selected to give the equivalent of 85.61% $Z_2$–$Z_3$ heat bodied oil. Each formulation was evaluated with and without the addition of 2% cobalt drier added as a 6% solution. The ingredients were mixed in a Shar High Speed Disperser®, Model D-10P at 2500 rpm for 10–15 min.

The drying properties of the vehicles were evaluated in the Prüfbau Printability Tester® previously described. The results are given in Table I.

The vehicles that dried immediately before the first dryer pass were considered suitable for sheet-fed inks. In some case the vehicle was dry before the first dryer pass, but was slightly wet afterwards. This is attributed to heat softening of the vehicle during drying and is not considered a significant drawback to the use of such vehicles for heat-set applications.

EXAMPLE 11

Using essentially the vehicle of Example 2, a sheet-fed ink was formulated from the following constituents:
41.00% carbon black dispersion (Kerley Soy 40®-Kerley Ink)
4.50% alkali blue toner (Flush®, BASF G1-SR-0456)
4.00% cobalt-drier (12%, Mooney Chemical Co., Inc.)
2.00% Mn-drier (6%, Mooney Chemical Co., Inc.)
0.50% Zn-drier (24%, Mooney Chemical Co., Inc.)
2.50% dry wax (Polyfluo 523XF®, Micro Powders)
5.00% rheological additive (Bentone 128®, Rheox, Inc.)
31.20% $Z_3$–$Z_4$ heat bodied soybean oil
3.47% $Z_1$–$Z_2$ heat bodied soybean oil
5.54% alkali refined soybean oil
0.29% methyl linoleate The ingredients were mixed in a Shar High Speed Disperser®, Model D-10P at 2500 rpm for 10–15 min. as described in Examples 2–10 and then milled on a water-cooled three-roll mill (Brazington) at successively increasing pressures until the particles in the dispersions were of a uniformly fine size. The tack value of this ink at 1 min. was measured to be 17 g-m using an Electronic Inkometer (1200 rpm, 90° C.). This ink was used in pilot scale runs on a Hamada® 19"×26" (48×66 cm) sheet-fed single color press with conventional damping. In the first run, printing was conducted on 17"×22" (43×56 cm) sheets of kenaf paper. Upon printing both sides, no setoff was noticed, thus providing evidence of adequate dryness. Hold out of color was excellent and very consistent throughout the run. It was not necessary to carry a quantity of ink on the rollers to obtain a solid coverage of color. The second run was conducted on 70# enamel coated paper. The drying time was comparable to conventional oil-based inks.

EXAMPLE 12

Using essentially the vehicle of Example 2, a heat-set ink was formulated from the following constituents:
45% carbon black dispersion (Kerley - Super 36® Kerley Ink)
6% alkali blue toner (Flush®, BASF G1-SR-0456)
5% Paste wax (cc-6209-D; Soy base wax, Carrol Scientific)
2% rheological additive (Bentone 500®, Rheox, Inc.)
2% cobalt-drier (6%, Mooney Chemical Co., Inc.)
40% Vehicle:
  30.82% $Z_3$–$Z_4$ heat bodied soybean oil
  3.42% $Z_1$–$Z_2$ heat bodied soybean oil
  5.47% alkali refined soybean oil
  0.29% methyl linoleate The ingredients were mixed in a Shar High Speed Disperser®, Model D-10P at 2500 rpm for 10–15 min. and milled as described in Example 11. This ink was tested for printability and drying on the Prüfbau Printability Tester as described above. Ink was dry after 1 pass on the Sinvatrol®, indicating the ink sample dried very rapidly as desired. Tack value of this ink at 1 min. was measured to be 12.2 g-m with an Electronic Inkometer (1200 rpm, 90° C.).

It is understood that the foregoing detailed description is given merely by way of illustration and that modification and variations may be made therein without departing from the spirit and scope of the invention.

TABLE I

| Example | Ester | Cobalt Drier (2%) | Dryer Pass* 0 | 1 | 5 | 10 |
|---|---|---|---|---|---|---|
| 2 | methyl linoleate | no | – | – | – | + |
| 3 | methyl linoleate | yes | + | + | | |
| 4 | methyl linolenate | no | + | sl | | |
| 5 | methyl linolenate | yes | sl | + | | |
| 6 | linseed oil, methyl ester | no | – | – | – | + |
| 7 | linseed oil, methyl ester | yes | + | + | | |
| 8 | safflower oil, methyl ester | no | + | sl | vsl | vvsl |
| 9 | safflower oil, methyl ester | yes | sl | + | | |
| 10 | tung oil, methyl ester | yes | + | + | | |

"–" = wet
"+" = dry
"sl" = slightly wet
"vsl" = very slightly wet
"vvsl" = very, very slightly wet
no entry indicates that the ink was not evaluated at that pass level

We claim:

1. A printing ink vehicle comprising: (1) a base oil selected from the group consisting of heat-bodied vegetable oil, petroleum resin and alkyd resin; (2) a nonheat-bodied, unsaturated vegetable oil; and (3) a monoester of an unsaturated fatty acid, wherein at least one of said nonheat-bodied, unsaturated vegetable oil and said monoester comprises a polyunsaturated fatty acid moiety selected from the group consisting of conjugated dienes, methylene-interrupted dienes, and polyenes having at least one pair of conjugated or methylene-interrupted double bonds.

2. A printing ink vehicle as described in claim 1 wherein said base oil is a heat-bodied vegetable oil.

3. A printing ink vehicle as described in claim 2, wherein said nonheat-bodied vegetable oil is selected from the group consisting of soybean oil, corn oil, linseed oil, canola oil, cottonseed oil, sunflower oil, and safflower oil.

4. A printing ink vehicle as described in claim 3 wherein said nonheat-bodied vegetable oil is soybean oil.

5. A printing ink vehicle as described in claim 1 wherein said monoester is a lower alkyl transester of an oil wherein at least about 45% of the fatty acid moieties of said oil have at least one pair of conjugated double bonds or at least one pair of methylene-interrupted double bonds.

6. A printing ink vehicle as described in claim 1 wherein said monoester is a lower alkyl transester of an oil selected from the group consisting of linseed oil and safflower seed oil.

7. A printing ink vehicle as described in claim 1 wherein said monoester is methyl linoleate or methyl linolenate.

8. A printing ink vehicle as described in claim 1 wherein said nonheat-bodied vegetable oil is soybean oil and said monoester is selected from the group consisting of methyl linoleate, methyl linolenate and mixtures thereof.

9. A printing ink formulation comprising a vehicle and a pigment, wherein the vehicle comprises: (1) a base oil selected from the group consisting of heat-bodied vegetable oil, petroleum resin and alkyd resin; (2) a nonheat-bodied, unsaturated vegetable oil; and (3) a monoester of an unsaturated fatty acid, wherein at least one of said nonheat-bodied, unsaturated vegetable oil and said monoester comprises a polyunsaturated fatty acid moiety selected from the group consisting of conjugated dienes, methylene-interrupted dienes, and polyenes having at least one pair of conjugated or methylene-interrupted double bonds.

10. A printing ink formulation as described in claim 9, wherein said base oil is a heat-bodied vegetable oil.

11. A printing ink formulation as described in claim 9, wherein said nonheat-bodied vegetable oil is selected from the group consisting of soybean oil, corn oil, linseed oil, canola oil, cottonseed oil, sunflower oil, and safflower oil.

12. A printing ink formulation as described in claim 9, wherein said nonheat-bodied vegetable oil is soybean oil.

13. A printing ink formulation as described in claim 9, wherein said monoester is a lower alkyl transester of an oil wherein at least about 45% of the fatty acid moieties of said oil have at least one pair of conjugated double bonds or at least one pair of methylene-interrupted double bonds.

14. A printing ink formulation as described in claim 9, wherein said monoester is a lower alkyl transester of an oil selected from the group consisting of linseed oil and safflower seed oil.

15. A printing ink formulation as described in claim 9, wherein said monoester is methyl linoleate or methyl linolenate.

16. A printing ink formulation as described in claim 9, wherein said nonheat-bodied vegetable oil is soybean oil and said monoester is selected from the group consisting of methyl linoleate, methyl linolenate and mixtures thereof.

* * * * *